United States Patent [19]

Goldschmidt et al.

[11] 4,173,330
[45] Nov. 6, 1979

[54] HYDROSTATIC LOAD RELIEF FOR LIFTING SPINDLES

[75] Inventors: Rolf Goldschmidt, Witten-Annen; Klaus Hänsgen, Witten; Heinz M. Hiersig, Düsseldorf; Fritz Kirstenpfad, Bad Harzburg, all of Fed. Rep. of Germany

[73] Assignee: Mannesmann Aktiengesellschaft, Dusseldorf, Fed. Rep. of Germany

[21] Appl. No.: 908,578

[22] Filed: May 22, 1978

[30] Foreign Application Priority Data

May 25, 1977 [DE] Fed. Rep. of Germany ....... 2724232

[51] Int. Cl.² .............................................. B66F 3/08
[52] U.S. Cl. .................................... 254/98; 184/1 R
[58] Field of Search ................... 184/1 R, 6.12, 6.28; 24/467, 468, 441; 254/98-103

[56] References Cited

U.S. PATENT DOCUMENTS

| | | |
|---|---|---|
| 2,352,117 | 6/1944 | Parternach ............................ 254/98 |
| 3,064,758 | 11/1962 | Ohrnberger ......................... 184/6.12 |
| 3,651,706 | 3/1972 | Galbarini et al. .................. 74/467 X |

*Primary Examiner*—Robert C. Watson
*Attorney, Agent, or Firm*—Smyth, Pavitt, Siegemund, Jones & Martella

[57] ABSTRACT

A lifting device having a rotating female threaded member and a non-rotating axially movable lifting spindle is load releaved by means of pressurized oil pumped to oil pockets in the threads of the female member. Multiple pumps are secured to the female member and are arranged in pairs with a common drive shaft and a pinion for each pair. The pinions all mesh with the internal gear of an annulus being concentrically arranged around the member and having an external gear for independent driving. The pumps are connected to the pockets by means of ducts, there being no fluid pass across moving interfaces. The pumps have a common suction feed which dips into an annular reservoir.

5 Claims, 4 Drawing Figures (A-A)

HYDROSTATIC LOAD RELIEF FOR LIFTING SPINDLES

BACKGROUND OF THE INVENTION

The present invention relates to hydrostatic load relief, and more particularly, to the load relief of a load bearing threaded spindle which is moved axially upon rotation of a meshing threaded member.

Lift devices of the type referred to above are known. The spindle in these devices is usually permitted to move axially while being prevented from rotation. The female member receiving the spindle is driven externally and is, of course, mounted for rotation in a suitable frame, stand, or the like. Other devices have a stationary threaded female member and a rotating spindle. It is also known to hydrostatically load-releave the load bearing spindle in that the threads of the female member have oil pockets which receive pressurized oil from a pump for taking up some of the load the spindle exerts upon the female threaded member.

It was found that feeding the oil to the pockets presents no problems, if the threaded member is stationary and the spindle rotates. However, if the female members turns, the oil transfer to the pockets is troublesome. At the very least, one needs special sealing means to avoid losses in the radial oil feed to and into the rotating member.

DESCRIPTION OF THE INVENTION

It is an object of the present invention to provide hydrostatic oil relief in lifting devices having a rotating, threaded, female member axially driving a threaded spindle.

In accordance with the preferred embodiment of the present invention, it is suggested to secure one or more pumps to the driven female member so that the oil transfer to the oil pockets in the threads and providing load relief, does not cross moving interfaces. The pump or pumps are driven by means of a pinion or pinions which mesh the internal gearing of an annular member which, in turn, is concentrically arranged to the spindle and its driving member. The annular member has an external gearing which meshes with a gear which, in turn, is driven independently from the spindle drive.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows a threaded spindle-type lifting device having, as basic components, a threaded female member 2, rotatably supported on a frame or stand 1, by means of bearings 35. The threads of member 2 engage the threads of a lifting stroke producing spindle 3. Spindle 3 is axially displaceable upon rotation of member 2, but the spindle itself is prevented from rotation by a key 9 in frame 1, which key does not, however, impede axial movement of the spindle.

Figure 4:
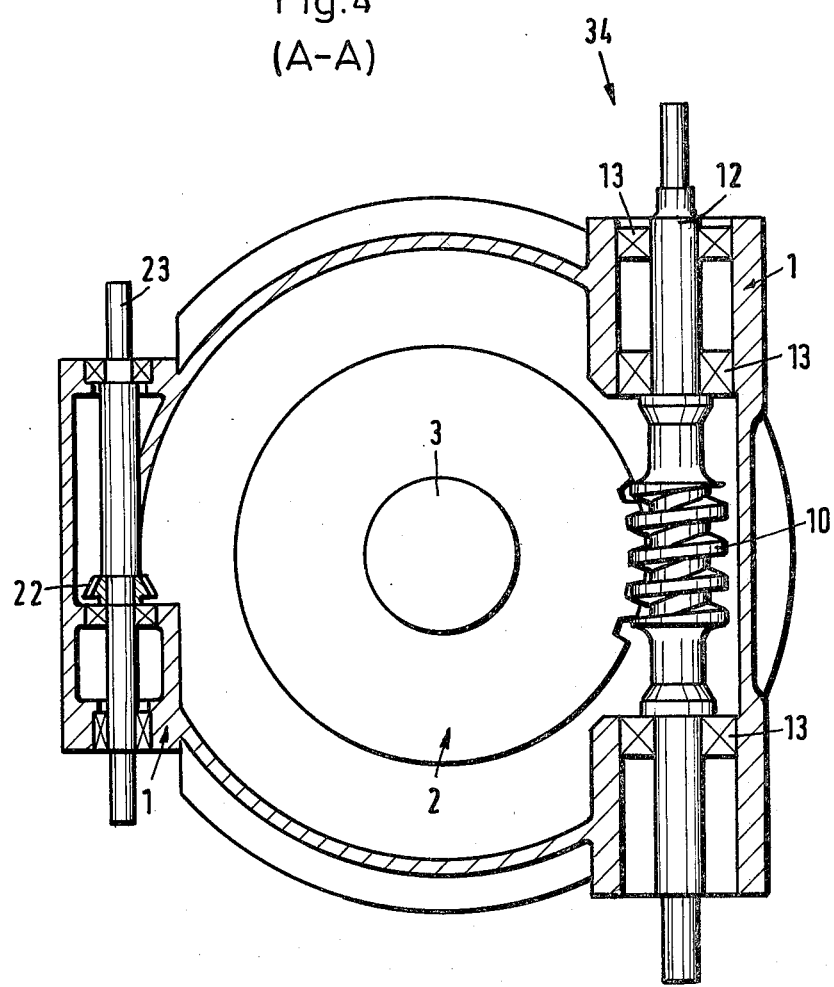
FIG. 4 is a section taken along lines A—A in FIG. 1.

Rotation of member 2 is provided by means of a drive 34 which includes a worm gear 10 being externally driven and meshing a gear 11 on the outside of member 2. Details of this particular drive are shown in FIG. 4, particularly the right-hand side thereof. The worm gear 10 is mounted for rotation in frame 1 by means of bearings 13. Reference numeral 12 refers to a drive shaft for the gear 10 and is connected to the drive motor (not shown) which causes ultimately the member 2 to turn and spindle 3 to move up or down.

Figure 1:
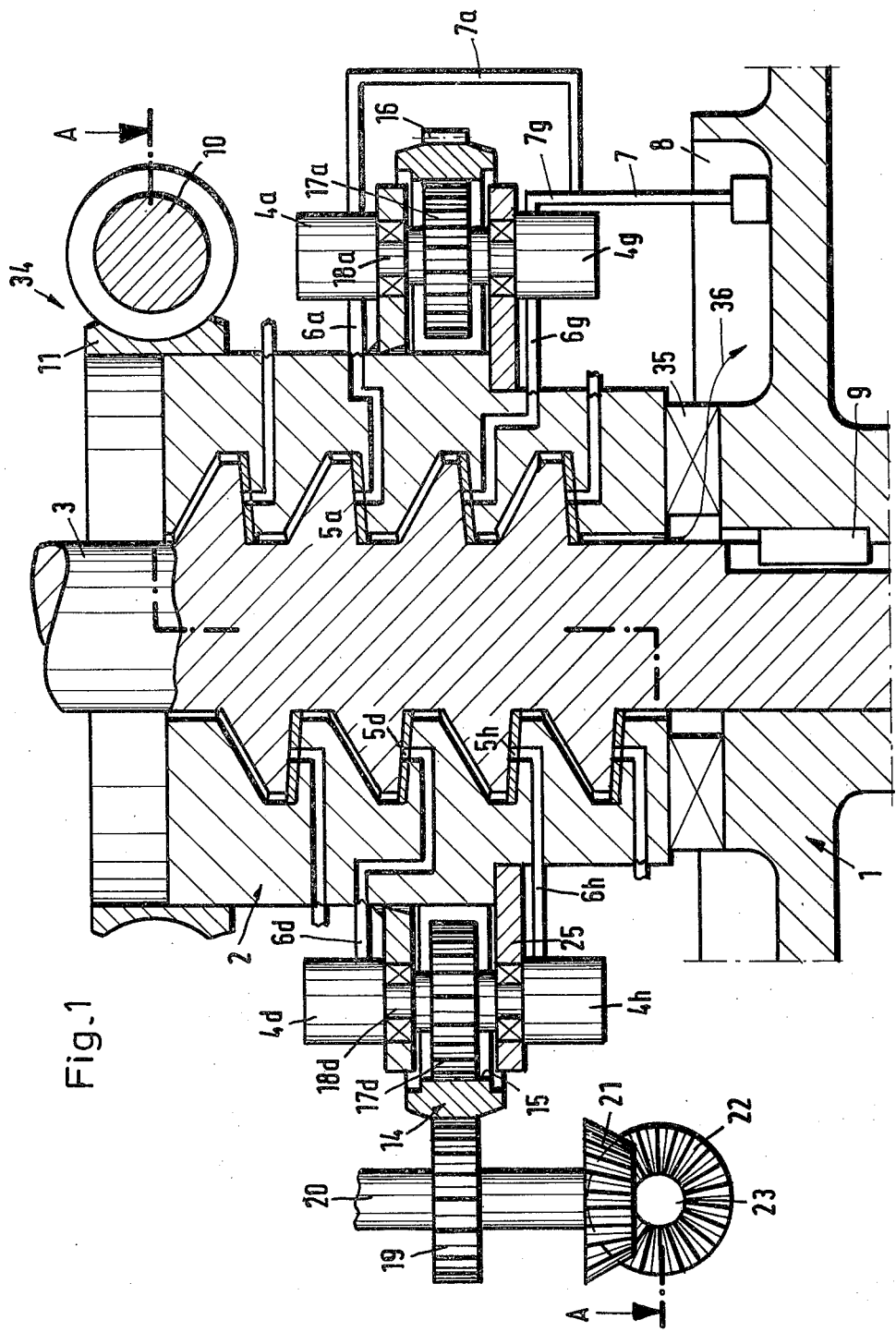
FIG. 1 is a cross-section through a hydrostatically load releaved lifting spindle in accordance with the preferred embodiment of the present invention.
Figure 2:
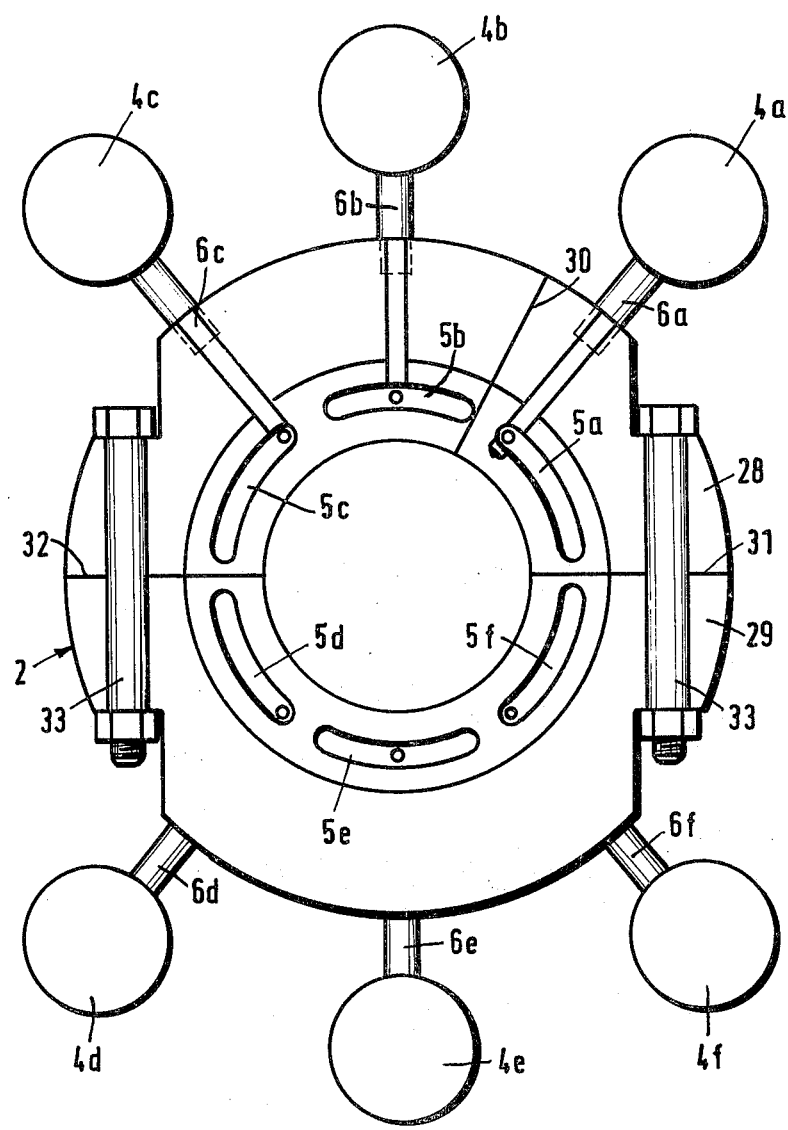
FIG. 2 is a top elevation of one threaded turn of the female member of FIG. 1.

Turning back to FIG. 1, and also to FIG. 2, the load bearing surfaces of the threads are provided with oil pockets 5a through 5h, respectively, connected to pressure oil pumps 4a to 4h, the connection being made by ducts 6a to 6h in the member 2. The pumps 4a to 4h are secured to member 2 in a manner described below and rotate therewith. These ducts 6a to 6h do not have to cross any interfaces of relatively moving parts.

It can readily be seen from FIG. 1 that oil pockets on sequential threads and being arranged one above the other, are connected to pumps which are arranged in pairs of axial alignment such as pumps 4a and 4g or pumps 4d and 4h. Other pairs are arranged around the common axis of the spindle system as shown in FIG. 2. Actually, there are twelve pumps; only eight are visible in the various drawings, but additional pumps are present and respectively paired with pumps 4b, 4c, 4e and 4f. Further pumps could be provided if needed. Also, additional oil pockets and ducts are provided.

Figure 3:
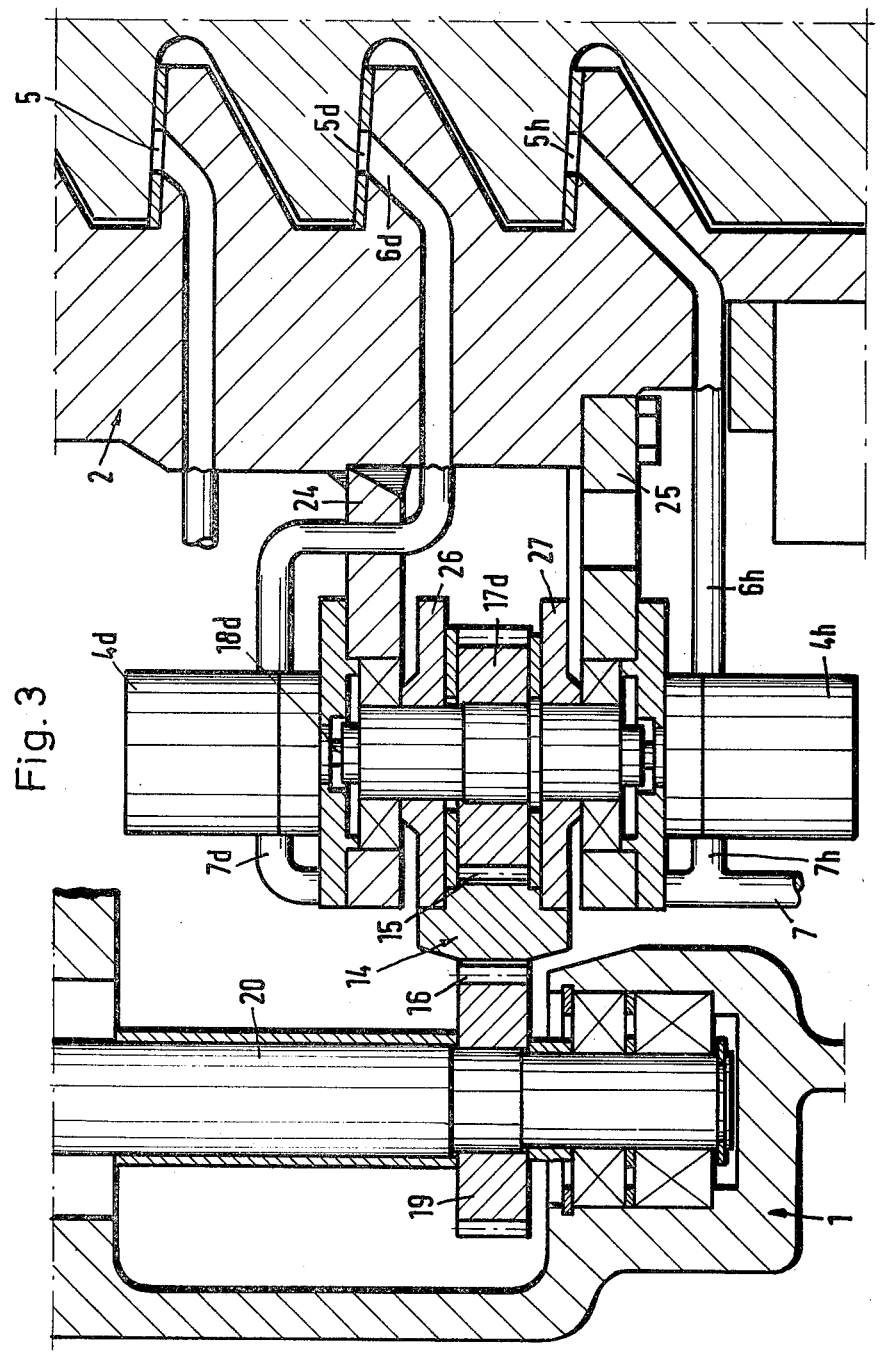
FIG. 3 is a more detailed portion of the device shown in FIG. 1 but shown in an enlarged scale.

FIG. 3 shows the drive of a pair of pumps in greater detail. The two pumps 4d and 4h (and others as arranged in such pairs), have a common drive shaft 18d carrying a pinion 17d which, in turn, meshes an annular member 14, having an internal gear 15 and an external gear 16. Annular member 14 is of larger diameter than member 2 (see FIG. 1), and its internal gear 15 meshes also a pinion 17a on a shaft 18a being the common drive shaft for pumps 4a and 4g. The gear 15 meshes actually all pinions for all drive shafts respectively driving pairs of pumps.

External gear 16 of annulus 14 meshes a gear 19 on a shaft 20 which, in turn, is driven via a pair of meshing bevel gears 21, 22, the latter being on a shaft 23 (see also the left-hand portion of FIG. 4). Shaft 23 is journalled in frame or stand 1 by means of several bearings, and is driven by means of another motor (not shown). This drive is independent from spindle drive 34 and its motor.

Annulus 14 is supported on and held by slide disks 26 and 27 in an annular rail-type fashion. Disks 26 and 27, in turn, are supported on shaft 18d and others. Additionally, the disks 26, 27 are mounted on member 2, respectively, by means of disks 24 and 25, which are secured to that member 2. The pumps are mounted to these disks in that upper pumps such as 4a to 4f are mounted to disk 24 and the lower pumps such as 4g and 4h are mounted to disk 24. These disks mount also the requisite bearings for journalling the pump shafts such as 18d and others.

All suction lines 7a through 7h of the pumps 4a to 4h are interconnected which feature solves the problem of oil feeding to the pumps in a rather simple manner. These lines 7a to 7h have a common feed duct 7 which dips into a stationary, annular, open oil reservoir 8. The feeder pipe has an entrance scoop which turns with member 2, and, therefore, provides for oil sucking intake irrespective of the position of rotating member 2. This reservoir and collection chamber 8 fulfills the added function of a return for the oil of the hydrostatic relief as indicated by arrow 36. That oil passes from between the threads, down the spindle and into the reservoir.

The member 2 is preferably longitudinally biparted and the two parts 28, 29 tied together by means of bolts 33, tightening the parts across the interfaces 31, 32. Each part holds several pump pairs, the arrangement is preferably a symmetrical one, at least as far as top elevation is concerned as seen in FIG. 2. The member 2 may also (or additionally) be composed of annuli which have been stacked and tied together.

The invention is not limited to the embodiments described above but all changes and modifications thereof not constituting departures from the spirit and scope of the invention are intended to be included.

We claim:

1. In a lifting device having a threaded spindle to be moved axially for production of a lifting stroke, further having a threaded female member threadedly engaging the spindle and being mounted for rotation, drive means for rotating the female member to move the spindle axially, a hydrostatic relief device, comprising:

oil pockets in load bearing threads of the threaded member;

oil pump means mounted to the member on the outside thereof, there being ducts in the member leading from the pump means to the oil pockets;

pinion means for driving the pump means;

an annular member having internal and external gearing, and being concentrically arranged around the threaded member, the internal gearing meshing the pinion means for driving same;

a gear journalled for meshing the external gear of the annular member; and means independent from said drive means for driving the gear to thereby operate the pump means to obtain the hydrostatic load relief.

2. The load relief device as in claim 1, wherein the pump means includes plural pumps arranged around the threaded member.

3. The load relief device as in claim 1, said pump means including at least two pumps, having a common drive shaft on which is mounted a pinion of the pinion means to drive the two pumps.

4. The lifting device as in claim 1, wherein the threaded member is axially biparted, there being bolt means holding the parts together; the load relief device including at least two pumps, one per part.

5. The load relief device as in claim 1, including a common oil reservoir arranged around the threaded member, the pump means having suction duct means dipping into the reservoir.

* * * * *